United States Patent
Kammer et al.

(10) Patent No.: US 7,573,149 B2
(45) Date of Patent: Aug. 11, 2009

(54) SYSTEM AND METHOD FOR CONTROLLING A WIND POWER PLANT

(75) Inventors: Leonardo Cesar Kammer, Niskayuna, NY (US); Mark Edward Cardinal, Altamont, NY (US); Hubert Oing, Berlin (DE)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 11/952,055

(22) Filed: Dec. 6, 2007

(65) Prior Publication Data

US 2009/0146424 A1 Jun. 11, 2009

(51) Int. Cl.
F03D 9/00 (2006.01)
(52) U.S. Cl. .......................... 290/55; 290/44
(58) Field of Classification Search .............. 290/44, 290/55; 416/132 B, 7; 60/398; 415/4.5, 415/2.1; 307/85; 700/286
See application file for complete search history.

(56) References Cited

U.S. PATENT DOCUMENTS

| | | | |
|---|---|---|---|
| 4,794,544 A * | 12/1988 | Albright et al. | 700/287 |
| 6,208,949 B1 * | 3/2001 | Eatwell | 702/189 |
| 2003/0160457 A1 * | 8/2003 | Ragwitz et al. | 290/44 |
| 2003/0185665 A1 * | 10/2003 | Hansen | 415/1 |
| 2006/0033339 A1 * | 2/2006 | Pasuri | 290/44 |
| 2007/0018457 A1 * | 1/2007 | Llorente Gonzalez | 290/44 |
| 2007/0216166 A1 * | 9/2007 | Schubert | 290/55 |
| 2007/0299548 A1 * | 12/2007 | Weitkamp | 700/52 |
| 2008/0103611 A1 * | 5/2008 | Altemark | 700/34 |

FOREIGN PATENT DOCUMENTS

| | | | |
|---|---|---|---|
| EP | 1672778 A2 * | 6/2006 | |
| WO | 9709531 | 3/1997 | |
| WO | 2006032451 | 3/2006 | |

* cited by examiner

*Primary Examiner*—Julio Gonzalez
(74) *Attorney, Agent, or Firm*—Ann M. Agosti

(57) ABSTRACT

An apparatus and method for extending the power-capture region of a wind turbine during certain operating conditions is disclosed. The actual set point of an operational parameter is selected so as to be maintained at a predetermined number of standard deviations away from an operating limit during certain operating conditions. For example, the operational parameter may be a rotor/generator speed and the operating condition may be a mean wind speed that exceeds a predetermined wind speed.

8 Claims, 4 Drawing Sheets

SYSTEM AND METHOD FOR CONTROLLING A WIND POWER PLANT

BACKGROUND

This invention relates generally to wind turbines, and more particularly to methods and apparatus for efficiently reducing load in wind turbines.

Recently, wind turbines have received increased attention as an environmentally safe and relatively inexpensive alternative energy source. With this growing interest, considerable efforts have been made to develop wind turbines that are reliable and efficient.

Generally, a wind turbine includes a rotor having multiple blades. The rotor is mounted within a housing or nacelle, which is positioned on top of a truss or tubular tower. Utility grade wind turbines (i.e., wind turbines designed to provide electrical power to a utility grid) can have large rotors (e.g., 80 or more meters in diameter). Blades on these rotors transform wind energy into a rotational torque or force that drives one or more generators, rotationally coupled to the rotor through a gearbox. The gearbox may be used to step up the inherently low rotational speed of the turbine rotor for the generator to efficiently convert mechanical energy to electrical energy, which is fed into a utility grid. Some turbines utilize generators that are directly coupled to the rotor without using a gearbox.

Currently, the control strategy and safety concept shut down the wind turbine above a certain (cut out) wind speed. This strategy prevents damaging loads that might occur due to the higher turbulence in the wind. The disadvantage of this strategy is the lack of energy capture in the region above cut out wind speed. Also, a brief increase in wind speed might trigger a turbine shutdown, while the recovery to normal power production may take some time. On the same token, the occurrence of high turbulence at rated wind speeds will also increase the likelihood of triggering a turbine shutdown.

BRIEF DESCRIPTION

Briefly, in one aspect of the invention a method for controlling a wind turbine comprising the steps of:

measuring an operating parameter of the wind turbine;

determining a standard deviation of the measured operating parameter; and selecting an operating set point such that the operating set point is maintained a pre-determined number of standard deviations away from an operating limit.

In another aspect of the invention, a wind turbine comprises a rotor having a plurality of blades; and a control system configured to measure an operating parameter of the wind turbine, wherein said control system determines a standard deviation of the measured operating parameter and selects an operating set point such that the operating set point is maintained a pre-determined number of standard deviations away from an operating limit.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
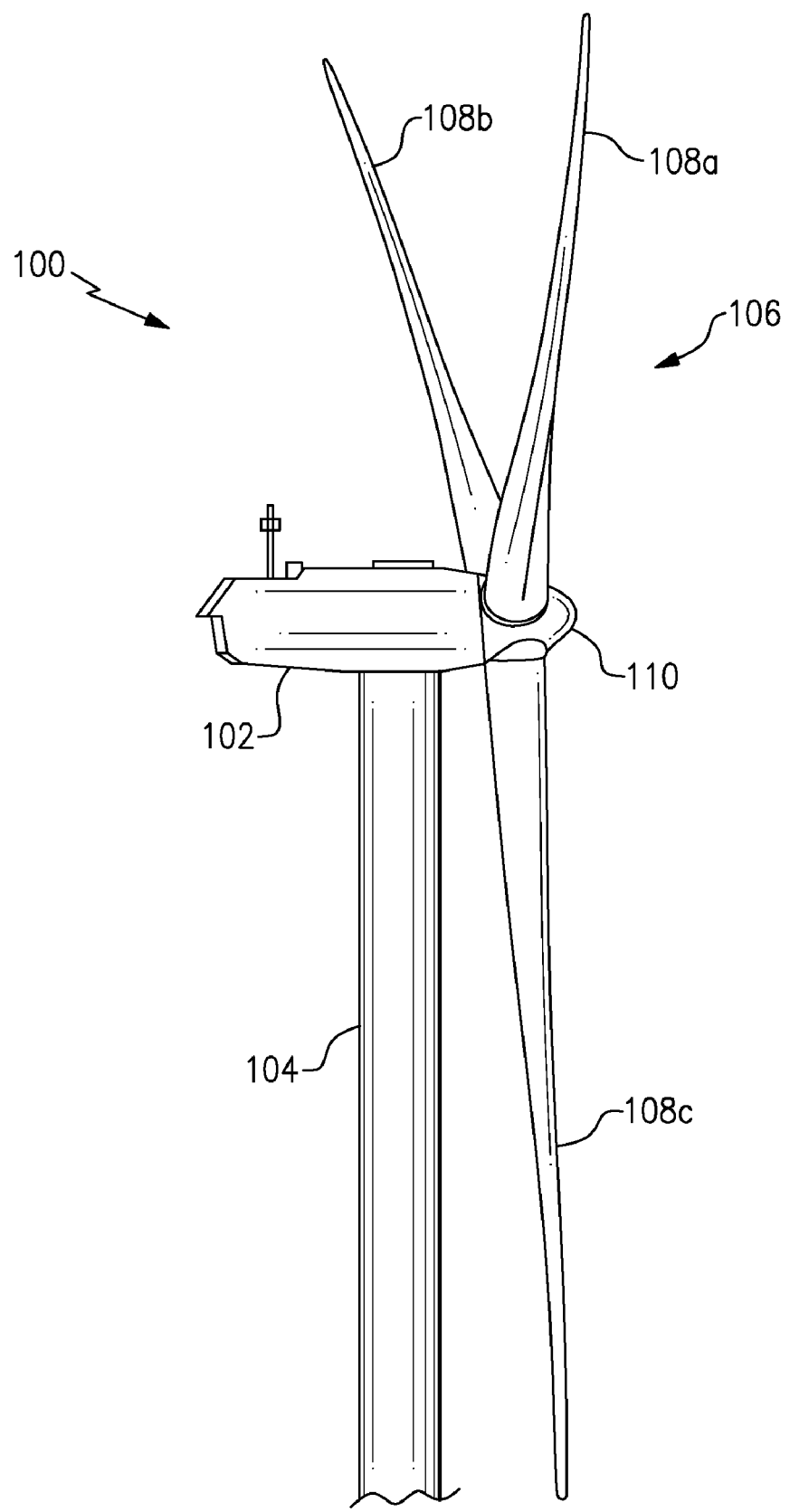
FIG. 1 is a drawing of an exemplary configuration of a wind turbine.

Referring to the drawings wherein identical reference numerals denote the same elements throughout the various views, Referring now to FIG. 1, a wind turbine 100 in some configurations comprises a nacelle 102 housing a generator (not shown in FIG. 1). A nacelle 102 is mounted atop a tall tower 104, only a portion of which is shown in FIG. 1. The wind turbine 100 also comprises a rotor 106 that includes a plurality of rotor blades 108 attached to a rotating hub 110. Although the wind turbine 100 illustrated in FIG. 1 includes three rotor blades 108, there are no specific limits on the number of rotor blades 108 required by the invention.

Figure 2:
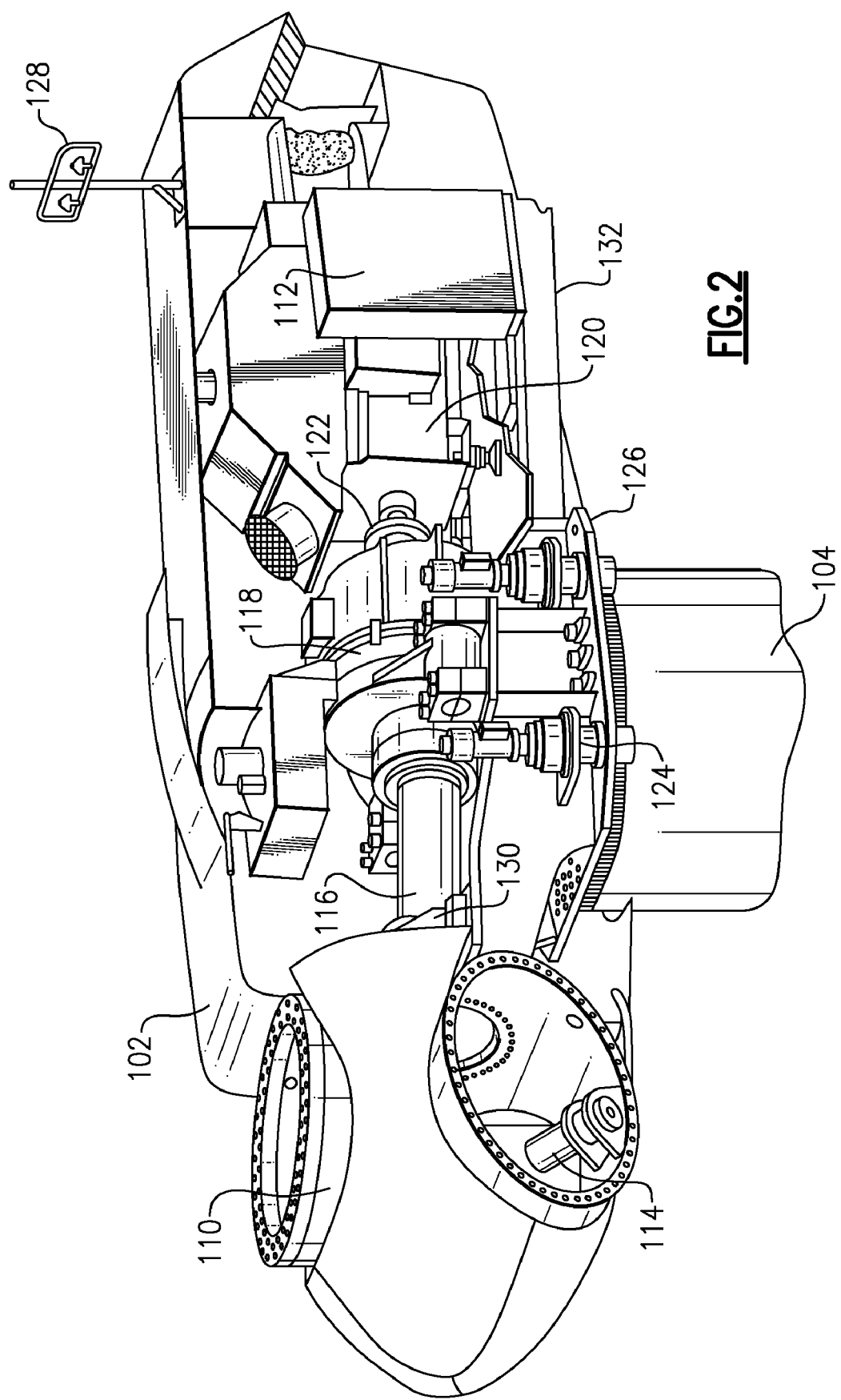
FIG. 2 is a cut-away perspective view of a nacelle of the exemplary wind turbine configuration shown in FIG. 1.

Referring now to FIG. 2, various components are housed in the nacelle 102 atop the tower 104 of the wind turbine 100. The height of the tower 104 is selected based upon factors and conditions known in the art. In some configurations, one or more microcontrollers within the control panel 112 comprise a control system are used for overall system monitoring and control including pitch and speed regulation, high-speed shaft and yaw brake application, yaw and pump motor application and fault monitoring. Alternative distributed or centralized control architectures are used in some configurations.

The control system provides control signals to a variable blade pitch drive 114 to control the pitch of blades 108 (not shown in FIG. 2) that drive the hub 110 as a result of wind. In the illustrated embodiment, the hub 110 receives three blades 108, but other configurations can utilize any number of blades. The pitches of the blades 108 are individually controlled by blade pitch drive 114. The hub 110 and blades 108 together comprise wind turbine rotor 106.

The drive train of the wind turbine includes a main rotor shaft 116 (also referred to as a "low speed shaft") connected to the hub 110 and a gearbox 118 that, in some configurations, utilizes a dual path geometry to drive a high speed shaft enclosed within gear box 118. The high speed shaft (not shown in FIG. 2) is used to drive the generator 120. In some configurations, rotor torque is transmitted by a coupling 122. The generator 120 may be of any suitable type, for example, a wound rotor induction generator. In some configurations, a gearbox is not used, and instead, the rotor shaft 116 directly drives the generator 120.

Figure 3:
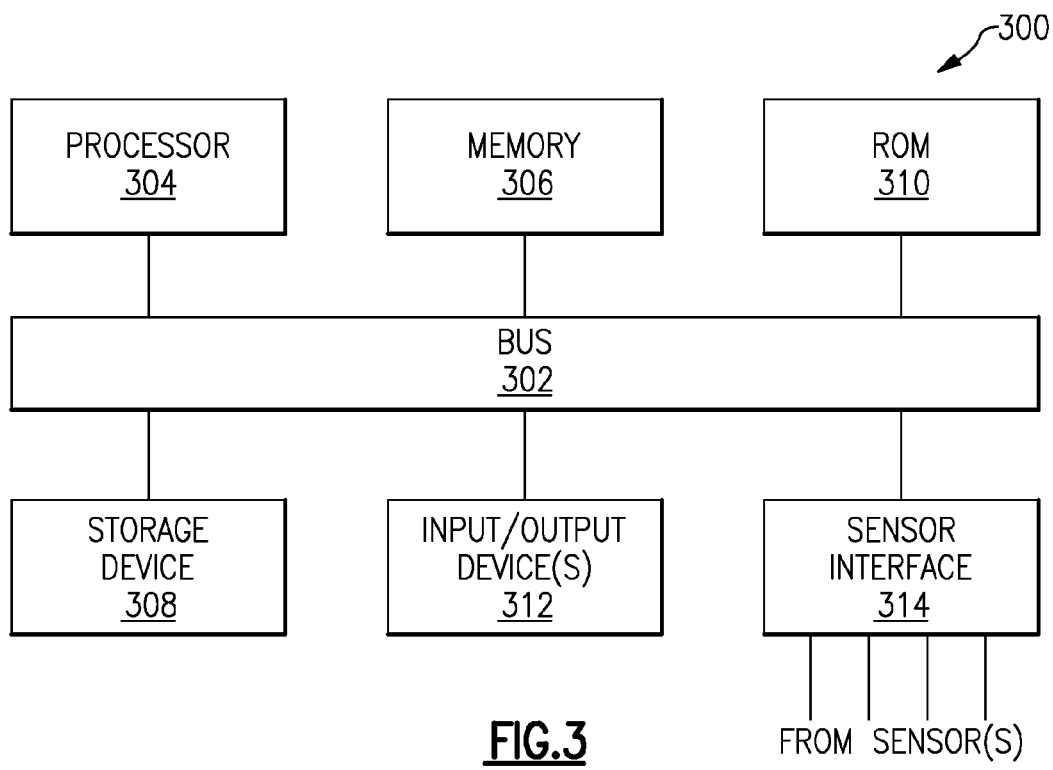
FIG. 3 is a block diagram of an exemplary configuration of a control system for the wind turbine configuration shown in FIG. 1.

Referring now to FIG. 3, a control system 300 for the wind turbine 100 includes a bus 302 or other communications device to communicate information. Processor(s) 304 are coupled to the bus 302 to process information, including information from sensors configured to measure displacements or moments. The control system 300 further includes random access memory (RAM) 306 and/or other storage device(s) 308. The RAM 306 and storage device(s) 308 are coupled to the bus 302 to store and transfer information and instructions to be executed by processor(s) 304. RAM 306 (and also storage device(s) 308, if required) can also be used to store temporary variables or other intermediate information during execution of instructions by processor(s) 304. The control system 300 can also include read only memory (ROM) and or other static storage device 310, which is coupled to the bus 302 to store and provide static (i.e., non-changing) information and instructions to processor(s) 304. The input/output device(s) 312 can include any device known in the art to provide input data to the control system 300 and to provide yaw control and pitch control outputs. Instructions are provided to memory from a storage device, such as magnetic disk, a read-only memory (ROM) integrated circuit, CD-ROM, DVD, via a remote connection that is either wired or wireless providing access to one or more electronically-accessible media, and the like. In some embodiments, hard-wired circuitry can be used in place of or in combination with software instructions. Thus, execution of sequences of instructions is not limited to any specific combination of hardware circuitry and software instructions. The sensor interface 314 is an interface that allows the control system 300 to communicate with one or more sensors. The sensor interface 314 can be or can comprise, for example, one or more analog-to-digital converters that convert analog signals into digital signals that can be used by the processor(s) 304.

It is known that the major part of the loading of a wind turbine is caused by the effect of the relative wind speed on the blades. The load on the blades is generally defined by the lift and drag forces, which act along a virtual lift centerline extending along the front edge of the blade, and about 25% of the blade width behind the front edge. The turbulence in the wind produces fluctuations in blade loads, which propagate to the rest of the turbine components causing structural fatigue.

The loading on the wind turbine can be reduced in an efficient manner by reducing the relative wind speed. In practice, this can be achieved by reducing the rotational speed of the rotor. However, by reducing the rotational speed of the rotor, the torque into the gearbox will be increased (power=torque×rotational speed) if the electrical output power of the generator is not correspondingly reduced.

During operation of the wind turbine 100, various operating parameters are measured by sensors and stored in the RAM 206 and/or the storage device(s) 308. For example, an external wind direction sensor and an external wind turbulence sensor may provide information relating to the wind speed, direction, and turbulence. A strain gauge mounted on the blades may provide information relating to the bending forces acting on the blades. Accelerometers mounted in one or more of the blades may provide information relating to the momentary angular position of the rotor and each blade. Temperature sensors may provide information relating to the temperature of one or more components of the drive train and/or the generating system. Acceleration or vibration sensors may provide information relating to the vibration level or noise in one or more components of the drive train and/or the generating system. A power sensing system may provide information relating to the output power of the generator. A pitch control system may provide information on wind turbulence and/or wind sheer. The data from the sensor is recorded over time and the bus 302 sends this information to the processor(s) 304.

A typical operating range for the wind turbine occurs at a wind speed, for example, of between about 3 m/s to about 25 m/s. Currently, the control strategy is to shutdown the wind turbine above a certain (cut out) mean wind speed, for example, of about 25 m/s. The main reason for this strategy is to prevent damaging loads that might occur due to wind gusts and turbulence at high wind speeds. However, the disadvantage of this strategy is the lack of energy capture in the region above cut out wind speed because when a conventional wind turbine has been shut down, it cannot reconnect to the grid at the same wind speed because of the very high loading of the turbine at this wind speed. Thus, reconnection will occur when the wind speed has been lower than the cut out wind speed for an appropriate amount of time for example, about 30 minutes or more. Another disadvantage of this strategy is that a brief increase in wind speed might trigger a turbine shutdown in a conventional wind turbine, while the recovery to normal power production may take some time. On the same token, the occurrence of high turbulence at rated wind speeds will also increase the likelihood of triggering a turbine shutdown. Besides the loss in energy capture, turbine shutdowns cause potential problems to the grid stability due to the abrupt change in generated power.

One aspect of the invention is to maintain the speed and power of the wind turbine as high as possible during weather conditions with high wind speed, gustiness, and/or turbulence. In particular, the speed and power may be maintained at higher levels than in a conventional wind turbine. This aspect of the invention is achieved by selecting an operating set point as a function of the standard deviation of the measured operating parameter such that the operating set point is maintained below a certain number of standard deviations from a set point limit. In one example of the invention, the rotor/generator speed set point is selected such that the rotor/generator speed set point is maintained a certain number of standard deviations away from a rotor/generator over speed limit.

The standard deviation of the rotor/generator speed can be estimated as follows:

$$\sigma_{\omega_r} = \sqrt{G(z) \cdot (\omega_r^{spt} - \omega_r)^2} \qquad \text{(Eq. 2)}$$

where, $\sigma_{\omega_r}$ is the standard deviation in rotor/generator speed;
$G(z)$ is a low-pass filter;
$\omega_r^{spt}$ is the rotor/generator speed set point; and
$\omega_r$ is the measured rotor/generator speed.

Figure 4:
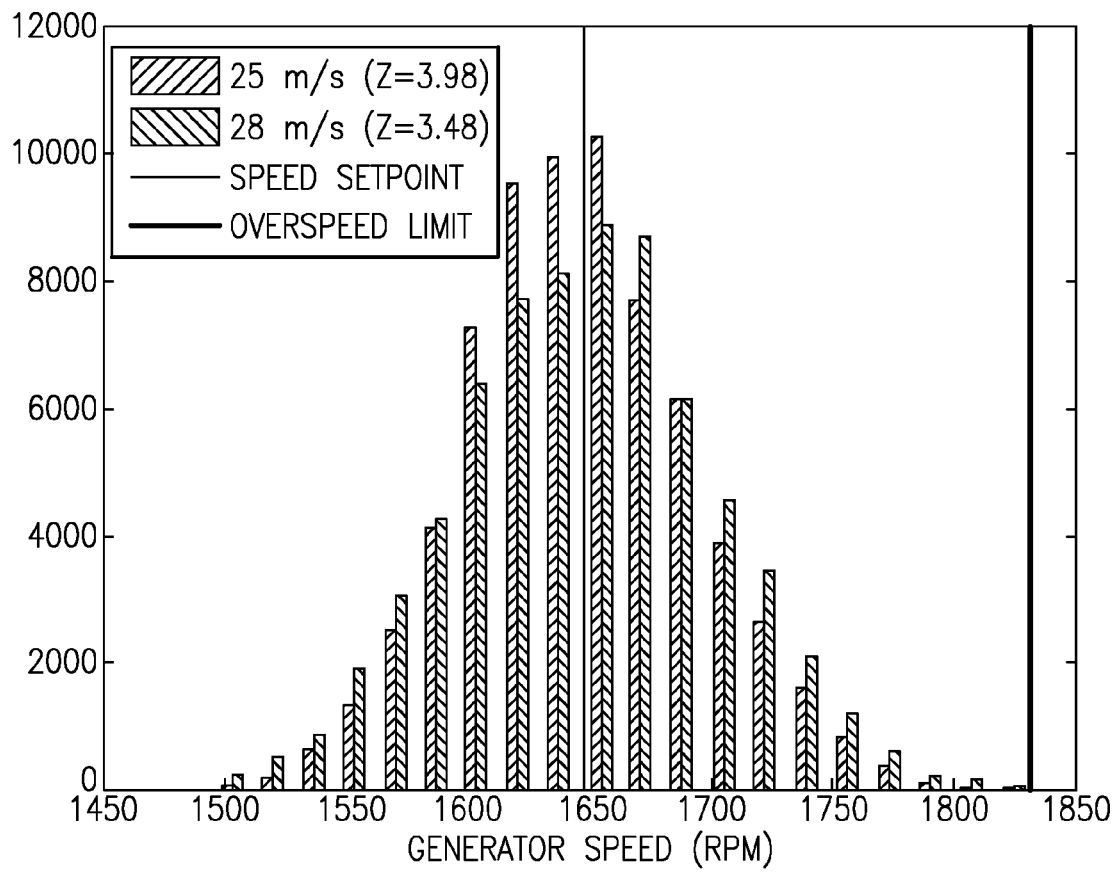
FIG. 4 is a histogram of generator speed as a function of the number of measurements at two different mean wind speeds of 25 m/s and 28 m/s.

Referring now to FIG. 4, a histogram of generator speed at two different mean wind speeds of about 25 m/s and about 28 m/s is shown. At the mean wind speed of about 25 m/s, the generator speed set point of about 1650 rpm, for example, is below the over speed limit by about 3.98 standard deviations. At a wind speed of about 28 m/s, which is above the cut out wind speed in a conventional wind turbine, the same rotor/generator speed set point is about 3.48 standard deviations away from the same rotor/generator over speed limit.

One aspect of the invention is to select a rotor/generator speed set point such that the set point is maintained a predetermined number of standard deviations away from the over speed limit. In other words, the rotor/generator speed set point is selected to maintain a margin of a predetermined number of standard deviations away from the over speed limit. This inventive aspect of the invention can be invoked continuously and/or when the mean wind speed exceeds a given threshold.

Figure 5:
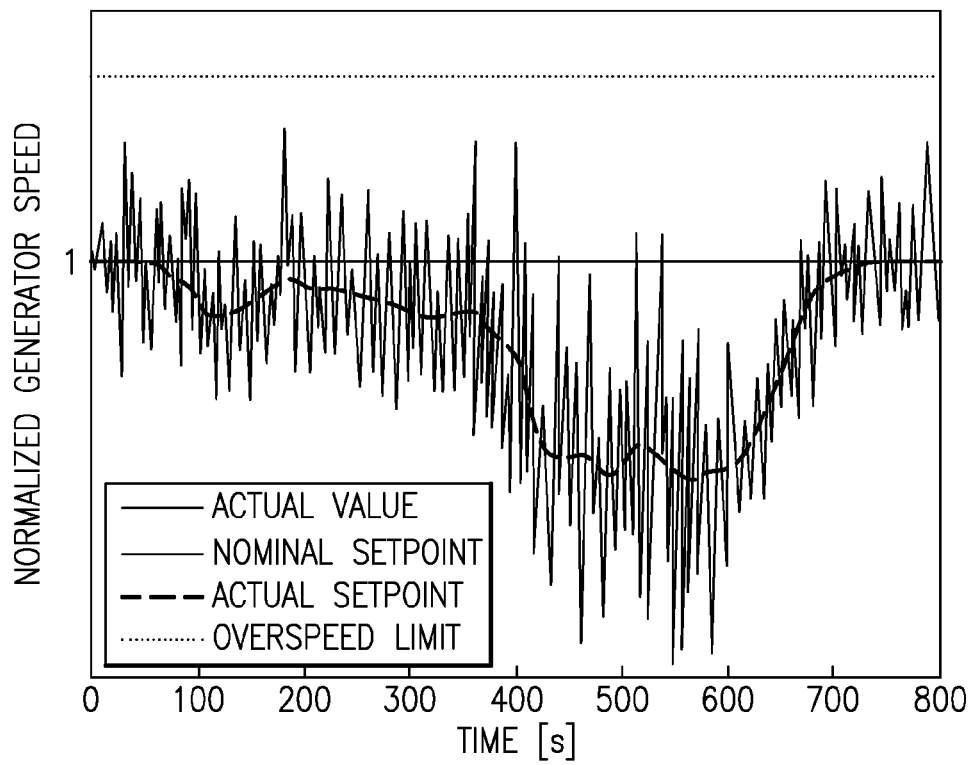
FIG. 5 is a graph of normalized generator speed as a function of time.

FIG. 5 shows a graph of normalized, measured generator speed as a function of time, which is summarized in Table I below.

TABLE I

| Time (s) | Mean Wind speed (m/s) | Turbulence Intensity (%) |
| --- | --- | --- |
| <250 | 25 | 12 |
| 250-350 | 28 | 12 |
| 350-600 | 28 | 22 |
| >600 | 25 | 12 |

As shown in FIG. 5, an operating set point, such as the rotor/generator speed set point (the lighter dashed line in FIG. 5), is selected as a function of the standard deviation in a measured operating parameter, such as the rotor/generator speed (the black solid line in FIG. 5) is maintained below a set point limit, such as the rotor/generator over speed limit (the darker dashed line in FIG. 5). For example, the rotor/generator speed set point is selected to be maintained about 6 standard deviations away from the rotor/generator over speed limit in a continuous manner over all mean wind speeds. The method of the invention keeps the wind turbine running, while keeping the stressing loads within the maximum envelope of the turbine configuration. It will be appreciated the invention is not limited by the number of standard deviations that operating set point is maintained below the set point limit. For example, the invention can be practiced by selecting the operating set point such that the operating set point is maintained away from the set point limit by a predetermined number of standard deviations, for example, 4 or 5 standard deviations, of the measured operating parameter.

It will be appreciated that the rotor/generator set point will be indirectly selected based on the combination of wind speed and wind turbulence. Thus, it is possible that the rotor/generator set point would remain unchanged during high wind speed conditions (above a cut out wind speed), but very low wind turbulence. Conversely, it is possible that the rotor/generator set point would be reduced during low wind speed conditions (below the cut wind speed), but very high wind turbulence.

As shown in FIG. 5, the actual set point (grey dashed line) both decreases and increases between about 50 seconds and about 750 seconds. In particular, the actual set point is reduced to about 90% of the normalized value at time zero between about 400 seconds and 600 seconds when the combination of the mean wind speed and wind turbulence is the highest. However, the actual set point increases rather significantly between about 600 seconds and 700 seconds once the combination of mean wind speed and wind turbulence decreases.

As mentioned above, the loading on the wind turbine can be reduced in an efficient manner by reducing the relative wind speed. In practice, this can be achieved by reducing the rotational speed of the rotor. However, by reducing the rotational speed of the rotor, the torque into the gearbox will be increased (power=torque×rotational speed) if the electrical output power of the generator is not correspondingly reduced. Therefore, it is desirable to reduce the electrical output power of the generator when the rotor/generator speed is reduced.

Figure 6:
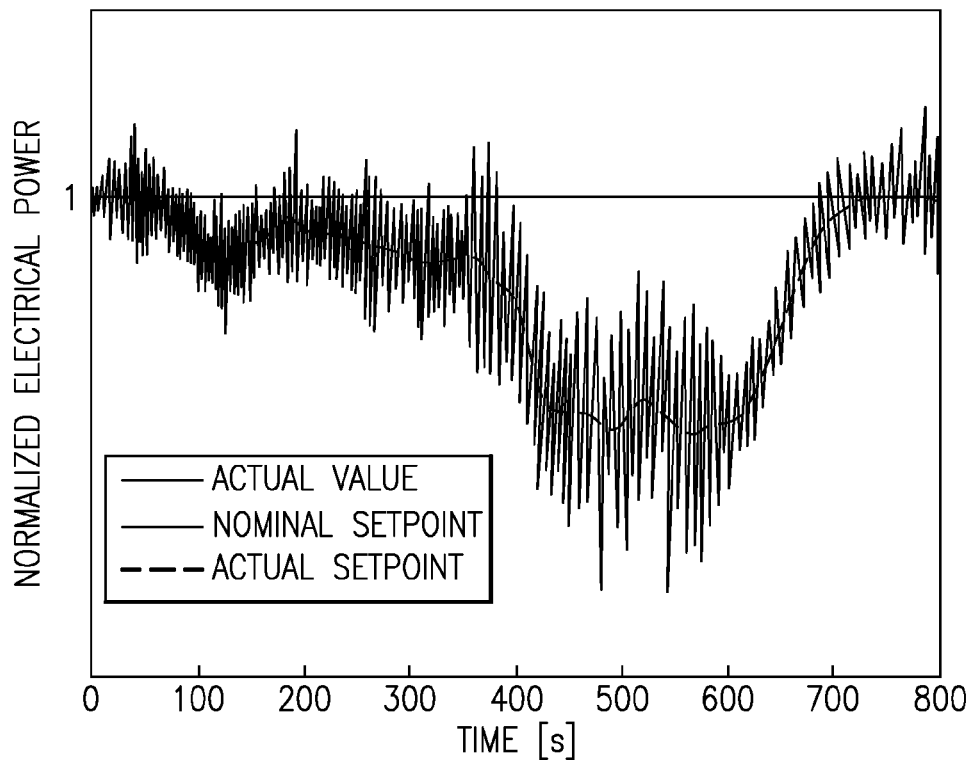
FIG. 6 is a graph of normalized generator electrical power as a function of time.

The invention is not limited to selecting the rotor/generator speed set point such that the set point is maintained a predetermined number of standard deviations away from the rotor/generator over speed limit, and that the invention can be used to select other desired operational parameters of the wind turbine. For example, the invention can be used to select the electrical power set point, as shown in FIG. 6, using the same example of mean wind speed and wind turbulence given in Table I. Thus, the invention can be used to select the actual set point for both the rotor/generator speed and the electrical power such that the actual set point is maintained a predetermined number of standard deviations away from the set point limit.

As described above, the invention provides a simple, time-based adjustment of the actual set point of an operational parameter to extend the power-capture region beyond the current cut out conditions with minimal hardware redesign of the wind turbine.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for controlling a wind turbine comprising the steps of:
   measuring an operating parameter of the wind turbine;
   determining a standard deviation of the measured operating parameter; and
   selecting an operating set point such that the operating set point is maintained a predetermined number of standard deviations from an operating limit, thereby maintaining operation of the wind turbine during adverse weather conditions.

2. The method of claim 1, wherein the operating set point comprises a rotor/generator speed set point, and wherein the measured operating parameter comprises rotor/generator speed, and wherein the operating limit comprises a rotor/generator overspeed limit that triggers a shutdown of the wind turbine.

3. The method of claim 2, wherein the selecting step occurs only when a mean wind speed exceeds a predetermined wind speed.

4. A wind turbine comprising:
   a rotor having a plurality of blades; and
   a control system configured to measure an operating parameter of the wind turbine, wherein said control system determines a standard deviation of the measured operating parameter and selects an operating set point such that the operating set point is maintained a predetermined number of standard deviations from an operating limit, thereby maintaining operation of the wind turbine during adverse weather conditions.

5. The wind turbine of claim 4, wherein the operating set point comprises a rotor/generator speed set point, and wherein the measured operating parameter comprises rotor/generator speed, and wherein the operating limit comprises a rotor/generator over speed limit that triggers a shutdown of the wind turbine.

6. The wind turbine of claim 5, wherein the operating set point is selected only when a mean wind speed exceeds a predetermined wind speed.

7. The method of claim 1, wherein the operating set point comprises an electrical power set point, and wherein the measured operating parameter comprises rotor/generator speed, and wherein the set point limit comprises a rotor/generator overspeed limit.

8. The method of claim 4, wherein the operating set point comprises an electrical power set point, and wherein the measured operating parameter comprises rotor/generator speed, and wherein the set point limit comprises a rotor/generator overspeed limit.

* * * * *